INVENTOR
RICHARD W. MORAN,
By
Beehler & Shanahan
ATTORNEYS.

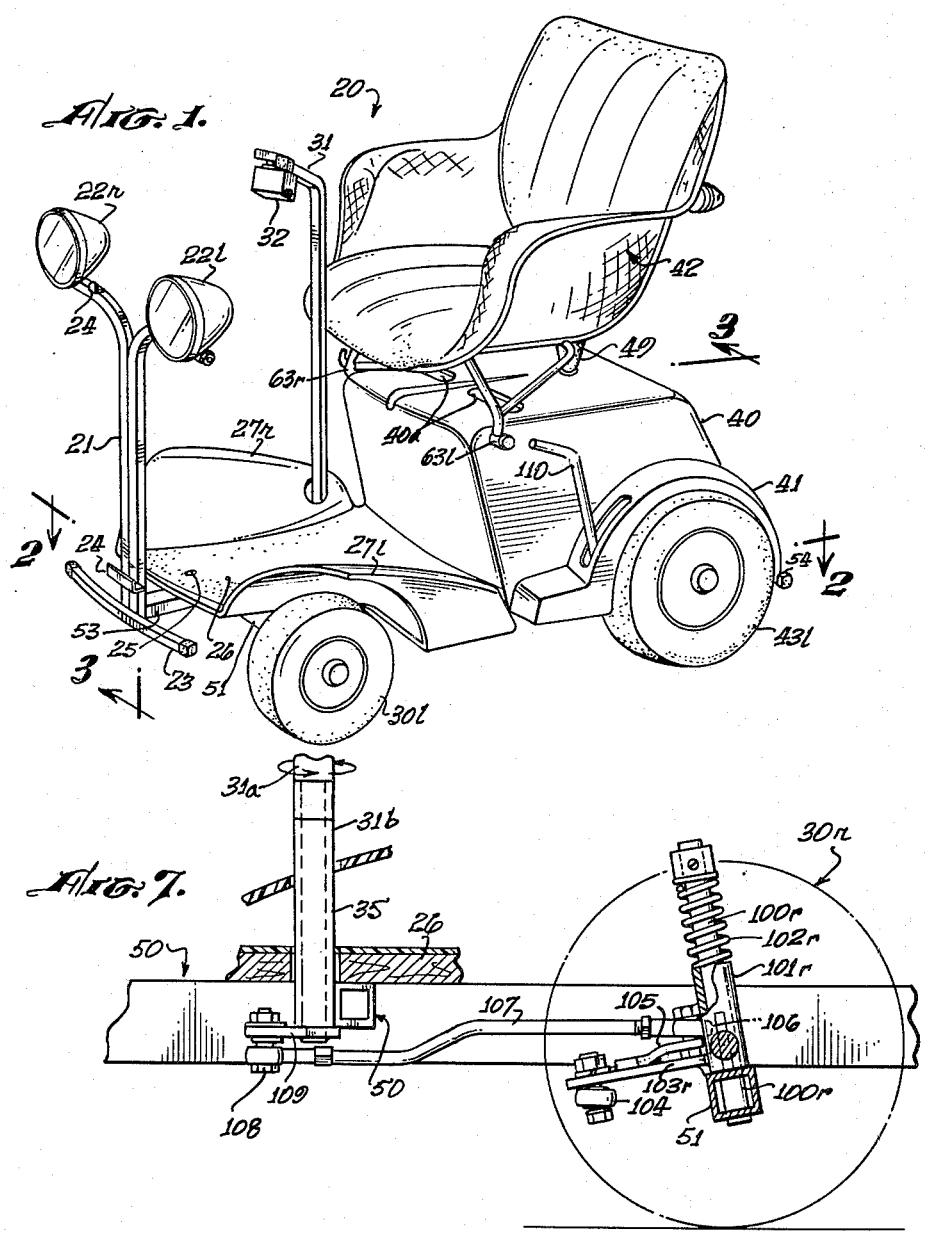

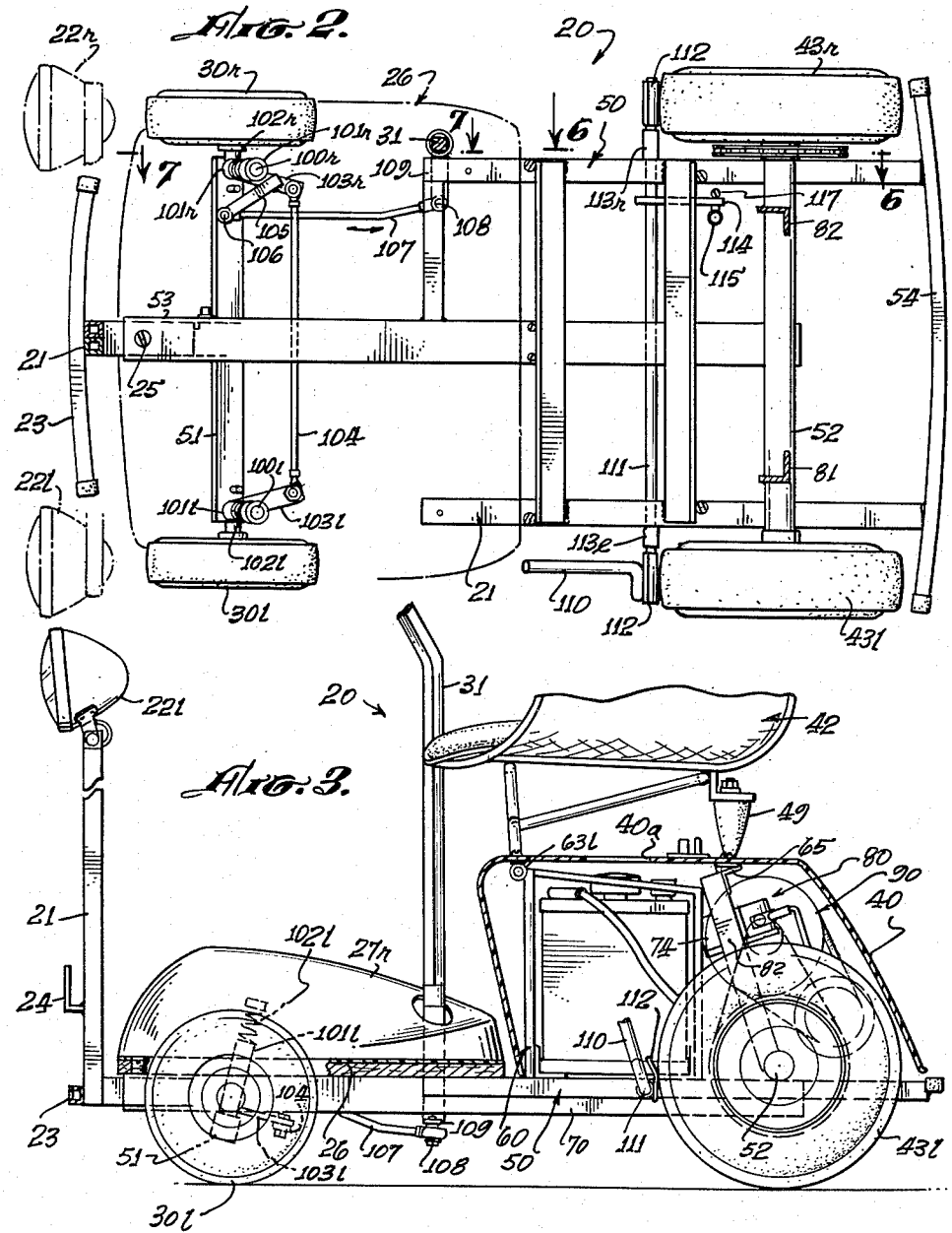

3,179,199
ELECTRICALLY PROPELLED CHAIR WITH COMPARTMENTED PROPULSION AND RECHARGING SYSTEMS
Richard W. Moran, 169 S. Fairfax Ave., Los Angeles, Calif.
Filed July 31, 1963, Ser. No. 298,928
7 Claims. (Cl. 180—65)

This invention relates generally to compact, single-passenger, electrically powered vehicles, and more particularly to such a vehicle in which the battery means, the motor means, and rectifier means for recharging means are compactly assembled under the seat of the chair, with a heat-sink barrier structure interposed between said rectifier means and said motor and said motor control circuit means, so as to protect the latter from heat and gases produced during recharging.

In its preferred form, the vehicle employs a unique system of springing in which the seat is transversely hinged under its forward edge, and front springing is achieved at the front wheels, while rear springing is accomplished under the rear of the seat.

Another preferred feature of the vehicle is the use of a demountable side tiller which provides both steering control and electric motor control without impinging on the leg and foot space of the vehicle occupant.

The single passenger vehicles powered by electrical batteries are not new. On the contrary, wtih the great improvements in capacity, durability, and general quality of design in batteries, small electrically powered vehicles have appeared in great variety of design and for a great variety of purposes. They have ranged from relatively lightweight, electrically powered wheel chairs for the physically handicapped, to golf carts and warehouse-lift trucks weighing between one-quarter ton and a ton. The very heavy electrically powered vehicles have achieved a substantial degree of commercial success in the particular fields for which they have been suited. However, no portable single-passenger electrically powered vehicle has achieved any substantial commercial acceptance.

One important and obvious application for such a vehicle, that of wheel chairs for physically incapacitated persons, illustrates the requirements for practical design and the inadequacies of previously known designs, which have resulted in their failure to achieve commercial acceptance. A wheel chair must be safely operable inside a house or other buildings, must be capable of passing through standard doorways, negotiating turns in narrow hallways, and must be free of the serious fire hazards which characterize gasoline powered vehicles. A wheel chair must be readily portable in a trunk of an average passenger car, if it is to find general utility. A wheel chair should be very stable, and free of any hazard to tip over sideways during turns, either during level travel or climbing, and must be free of any tendency to tip over backwards when climbing the maximum grade. Heretofore, no powered wheel chair has met all these requirements, and most have not met any of them.

Electrically powered wheel chairs of the past have generally required that the batteries be demounted from the wheel chair whenever the wheel chair was to be transported. Since the batteries are filled with an acid solution, the task of disconnecting them and carrying them separate from the wheel chair itself has proven so burdensome as to discourage any extensive use or acceptance of such chairs.

Wheel chairs have generally employed two very large wheels on each side of the occupant, and one or two front wheels. These chairs have generally been laterally collapsible. Thus, the chair's own electrically powered propulsion system could not be used to drive the chair up a lightweight ramp into the trunk of an automobile. The large wheels generally have made such an operation impossible. In addition, it has been necessary to dismantle the propulsion system, and laterally collapse the chair, prior to loading in the automobile trunk.

The requirement of portability has presented heretofore unsurmounted problems related to the requirement for recharging of the batteries. Unlike gasoline powered vehicles, electrically powered vehicles must be designed for a recharging cycle which is usually longer in duration than travel time, and subjects the vehicle, in some respects, to more wear and greater hazards. Any electrically powered vehicle intended for widespread use must be rechargeable by means of the 115-volt alternating current in general distribution by public utilities to electrical outlets in private homes and business establishments. It is, therefore, necessary to provide rectifier means for converting the alternating current to direct current of suitable voltage for recharging the batteries. All practical rectifier means involve the liberation of substantial quantities of heat for many hours during each recharging cycle. In addition, the batteries liberate potentially explosive hydrogen gas during recharging. In the past, it was at first attempted to simply omit the rectifier system from the vehicle, and provide it as a separate accessory. This did result in conserving some weight, and in preventing the electrical components of the vehicle from being exposed to the heat of recharging, but it is almost completely a failure as to public acceptance, so far as portable vehicles are concerned, since there was too much chance for the electrically powered vehicle to exhaust its power completely when at some location distant from the location of the separate rectifier. Users have not wished to rely on the portable electrically powered vehicle unless it carried with it its own rectifier so that it could be recharged at any convenient electrical outlet. It has not been a great problem to incorporate such rectifiers into the relatively massive single-passenger vehicles, such as golf carts. Since these vehicles were not intended to be portable, heavy rectification systems could be used, and could be spaced remotely from the motor control circuit, and the motor, or other components which might be injured by prolonged heating. In a portable vehicle, however, all of the electrical components including the battery, the rectifier, the motor control circuit, and the motor, must necessarily be located very close to one another, usually within the same small housing.

Electrically powered portable vehicles have generally been characterized, in the past, by both poor stability during travel, and poor springing. Those which have been sufficiently massive to climb steep grades and turn on them safely, have not been portable. Those which have been portable have had tendencies to tip over sidewise or even backwards on a grade. In the large-wheeled vehicles, the tendency toward instability has been aggravated by the location of the batteries. Since batteries must constitute one-third of the weight of a portable vehicle, their location is critical; but previously known portable vehicles have generally located them so near the axis of the rear wheels that they produced a backward turning moment on any moderate grade. An attempt to drive such a vehicle up a portable ramp into the trunk of an automobile could result in complete inversion of the vehicle with resultant spilling of acid from the batteries.

Heretofore, it has generally been considered that portability and the close spacing of the propulsion system precluded any springing sufficient to make the vehicle comfortable when driving over the average roadway at ten or fifteen miles per hour. It has simply been assumed that the portable vehicle would not be traveling at that velocity over an ordinary roadway. This assumption has not only presented the user with a choice between either a heavy vehicle or no springing, but has also presented him with a choice between either a heavy vehicle or one not acceptable for licensing as a road vehicle. In general, the portable vehicles have had electrical systems which would have rattled to pieces under roadway use without springs, and have lacked electrical lighting, turn signals, etc. which are required for licensing.

The present invention is a vehicle which meets all the requirements for roadway licensing, and yet is readily portable without the removal of the batteries. Indeed, the batteries are very firmly and securely mounted within a strong and enclosed structure intermediate between the front and rear axles. The vehicle carries its own rectifier circuit, and this circuit is of a novel and efficient design which is free of the tendency to damage the batteries, which has characterized most of the vehicle rectifier systems heretofore known for small vehicles. Consequently, the batteries may be securely fastened into the vehicle chassis, and not removed for many months, and possibly several years of use.

The battery, the motor, the rectifier, and the motor control circuit are closely and compactly assembled under the same housing, in a location best adapted to provide vehicle stability, but the injurious consequences which have heretofore resulted from the emission of heat and recharging gases within a closely confined space are avoided by a novel and ingenious method of dissipating the heat and scavenging the charging gases from the housing by means of convection currents of hot air.

All the circuitry has been designed to absorb the shocks of a completely unsprung vehicle, and to provide efficient commutation and low resistance connection so that the vehicle can be operated with only a 6-volt system, as compared with systems of at least twice that voltage universally used in previously known systems.

The vehicle is provided with a readily demountable chair, and a demountable tiller, as well as an optional demountable headlight bracket. Chair, tiller, and headlights may be quickly demounted from the vehicle, so that it becomes small enough to fit into an ordinary automobile trunk. Preferably, the tiller will be left on the vehicle while it is driven up a lightweight portable ramp into the trunk under its own power; the tiller will then be demounted for convenient packing into the trunk.

The foregoing and many other advantages of the present invention over the portable vehicles of the prior art will be best appreciated from an understanding of the construction and operation of a specific embodiment of the invention, one preferred form of which is illustrated in the accompanying drawings, and described in the remainder of this specification.

It will be understood, however, that the drawings and description are illustrative only, and not intended to restrict or limit the scope of the invention claimed. All or only some of the novel features may be incorporated in any one embodiment of the invention, which will be defined as to scope by the claims appended to this specification.

In the accompanying drawings:

FIGURE 1 is a perspective view of a vehicle constructed according to this invention, as viewed looking toward the vehicle's left front wheel;

FIGURE 2 is a plan view of the vehicle chassis, seen as viewed in the direction of the arrows 2—2 in FIGURE 1, but with all components above the chassis level removed for purposes of illustration and explanation;

FIGURE 3 is a left side sectional view taken at a longitudinal vertical plane through the center of the vehicle as indicated by the arrows 3—3 in FIGURE 1;

FIGURE 7 is a vertical sectional view, taken at the right front of the vehicle, as indicated by the arrow 7—7 in FIGURE 2, to show in detail features of the front wheel springing and steering;

Figure 10:
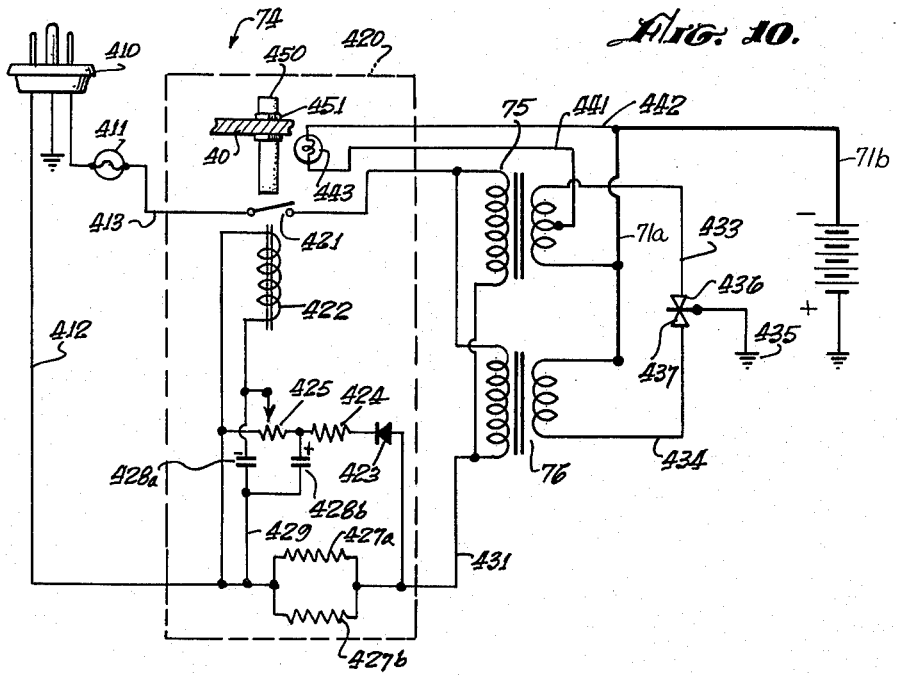
Figure 9:
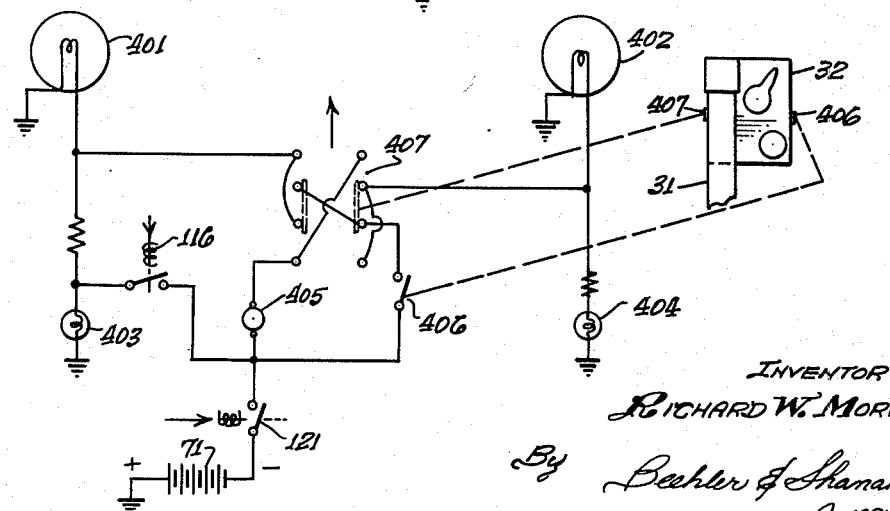

FIGURE 9 is an electrical wiring diagram illustrating the lighting circuit for providing in a very small system all the lighting requirements to obtain a vehicle license for traveling on a public highway; and FIGURE 10 is an electrical wiring diagram of the rectifier system carried in the vehicle and utilized for recharging the batteries by means of 115 volts alternating current from a standard public utility outlet.

In FIGURE 1, a single-passenger vehicle is indicated generally by the numeral 20. Reading from front to rear, the principal visible components of the vehicle are as follows:

Headlight column 21 which carries left and right headlights 22*l* and 22*r* as well as a front bumper 23 and brackets 24 for the mounting of a market basket.

It will be understood that the entire headlight column assembly 21 is demountable by loosening a screw 25, and disconnecting a plug, for wiring (not shown) concealed inside the tubular chassis to be described hereinafter.

Foot platform 26, a horizontal platform located at an elevation of about one step above ground, and formed with flaring left and right front fenders 27*l* and 27*r*.

Front wheels 30*l* and 30*r* (see FIGURE 2) which are steerable, in a manner to be described hereinafter.

It should be noted that the front fender 27*l* and 27*r* are cut away in such a manner that it is the resilient and soft rubber tires of wheels 30*l* and 30*r*, rather than the fenders, which encounter curbs and doorways, in case of inaccurate steering.

Tiller 31, carrying electrical control box 32, control wiring and plug 36, which is received in receptacle 37 on front fender 27*r*.

Housing 40, which includes rear wheel fenders 41, and openings 40*a* for servicing batteries (to be described hereinafter) and for the escape of charging gases.

A chair seat 42.

Rear wheels 43*l* and 43*r* (see FIGURE 2).

The horizontal section seen in plan view in FIGURE 2 reveals that all components of the vehicle are assembled onto a chassis 50, which may be, typically, a welded structure of rectangular steel tubing and angles.

Preferably the welded structure of chassis 50 is substantially in the form of a horizontal platform, which is movably carried by the four wheels, 30*l*, 30*r*, 43*l*, and 43*r*, which are rotatably mounted at the ends of rigid, non-rotating axles, front axle 51 and rear axle 52. Rear wheels 43*l* and 43*r* may be conveniently mounted coaxially with the heavy bar axle 52. However, it is preferred that front wheels 30*l* and 30*r* be carried on stub axles and kingpins in a manner to be described hereinafter.

Chassis 50 has a mounting receptacle 53 at the front for demountably mounting headlight column 21. At the rear, it includes a rear bumper 54.

The vertical sectional view of FIGURE 3 shows the manner in which foot platform 26 is securely mounted on chassis 50.

Figure 4:
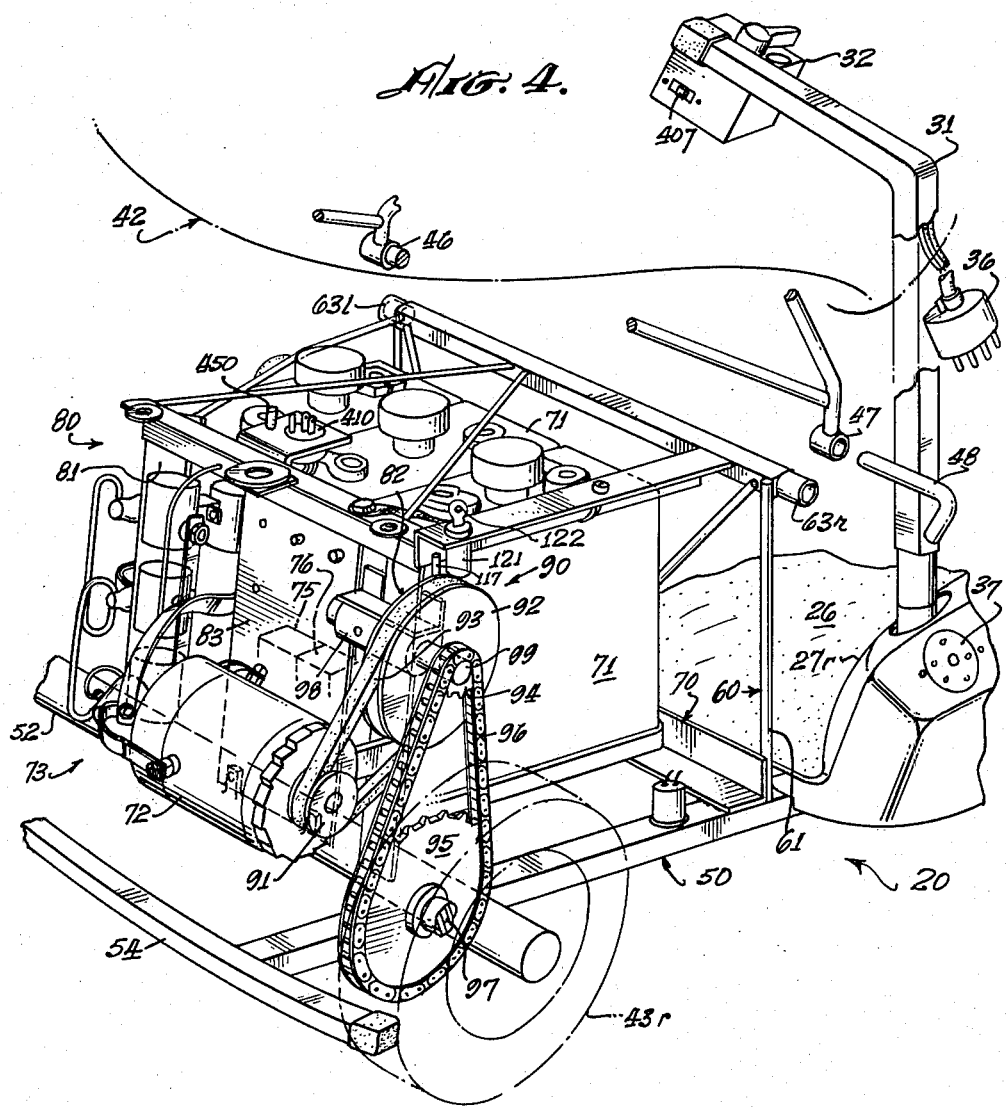
FIGURE 4 is a perspective view of the vehicle as seen from a point above the right rear wheel, with the chair indicated in phantom line only, the housing removed to expose the electrical system, and elements not essential for this illustration at the front and left side of the vehicle, fragmentarily broken away to clarify the illustration for purposes of explanation.

FIGURES 3 and 4, viewed together, disclose the chair-supporting structure, indicated generally by the numeral 60, and which provides the mounting means for the electrical propulsion system, indicated generally by the numeral 70, which is enclosed in the interior of housing 40.

In FIGURE 4, it is seen that the chair-supporting structure 60 is a welded structure of rods 61 and angle irons which is welded integrally into chassis 50 and projects upward therefrom to enclose a space under housing 40 only slightly larger than that required to contain a set of storage batteries 71.

The perspective view of FIGURE 4 reveals that the upper forward edge of chair-support structure 60 is provided, at its right and left ends, with a pair of co-axial sleeve 63l and 63r, which are at the location of a horizontal hinge axis transverse to the chassis 50, for hinge mounting chair 42, as will be described hereinafter.

Incorporated in the rear of chair-support structure 60 is a metal-barrier structure, generally indicated by the numeral 80 and comprised principally of angle irons 81 and 82, and aluminum plate 83. Barrier-structure 80 may be said to be substantially vertical, although, preferably, it is obliquely disposed a few degrees from the vertical, as indicated in FIGURE 3, so that it inclines upwardly from the rear axle 52 to the upper rear edge 65 of seat support structure 60.

The electrical system 70 includes, besides battery 71, an electric motor 72, an electric motor control circuit indicated generally by the numeral 73, and a rectifier system mounted on the forward side of barrier-structure 80 and indicated generally by the numeral 74.

Figure 5:
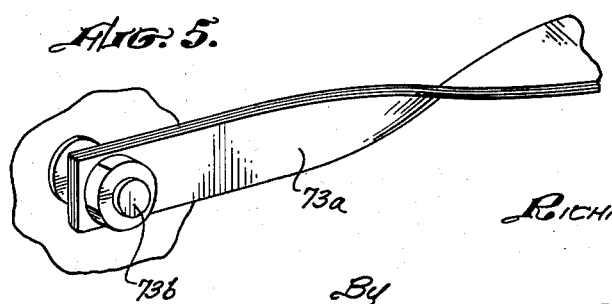
FIGURE 5 is an enlarged perspective view of one of the power conductors and terminals of the electrical system, showing the laminated strap type of conductor employed, and the massive copper bolt-stud connections employed to reduce resistance and eliminate conductor failure.

An important feature of the power wiring of the electric motor control circuit 73 is the employment of rigid laminated copper straps 73a, and copper bolted lugs 73b, illustrated in FIGURE 5.

The most important components of the rectifier system 74 from the standpoint of production of heat, and the distribution of weight, are a pair of relatively heavy transformers 75 and 76, seen in phantom line in FIGURE 4, which are mounted on the forward face of the aluminum panel 83.

FIGURE 4 reveals that the rear wheels 43l and 43r are driven by electric motor 72 by means of a reduction drive, indicated generally by the numeral 90 and comprised of a pair of pulleys 91 and 92 with the V-belt 93 and a pair of sprockets 94 and 95 with a chain 96. Sprocket 95 drives a shaft 97, to which rear wheels 43l and 43r are integrally mounted, and which is rotated within the tubular axle 52. It will be appreciated that, if desired, a differential between the two rear wheels 43l and 43r may be incorporated at the hub of one of the wheels. The right angle iron 82 of the barrier structure 80 serves as a convenient location for a pillow block 98 which provides rotational mounting for an idler shaft 99 carrying the previously mentioned pulley 92.

The vehicle is provided with a method of springing uniquely suited to a compact, single-passenger vehicle. The springing at the rear of the vehicle is associated with the mounting of chair 42. The springing at the front of the vehicle is associated with the steering system.

The chair 42 includes a hinge structure under its forward edge, which includes a stub-hinge pin 46 (see FIGURE 4) on the left side, and a right side hinge pin sleeve 47. A removable hinge pin 48 may be used to integrally assemble the chair 42 to the hinge sleeves 63l and 63r, the assembly being seen in FIGURES 1 and 3, and the parts being seen disassembled in the perspective view of FIGURE 4.

At the rear of seat 42, a resilient spring 49 is provided. In the embodiment shown, resilient spring 49 is a single resilient rubber cone, although it will be understood that other types of suitable springing might be employed.

The steering and front wheel springing is best seen in the plan view of FIGURE 2, in which one may view the left and right kingpins 100l and 100r, integrally welded into rectangular front axle 51 and tilting backward at a caster angle of about 18° in the specific embodiment shown. Steering sleeves 101l and 101r are rotatable and reciprocable on kingpins 100l and 100r, respectively, and are urged downwardly by front coil springs 102l and 102r, which are concentric with kingpins 100l and 100r, and serve to provide resilient support at the front of vehicle 20.

Integral with steering sleeves 101l and 101r are left and right steering arms 103l and 103r. These are connected together by tie rod 104, which causes them to move in unison. Both are moved by drive link lever 105, welded to steering arm 103, and pivotally connected at 106 to a drag link 107 which is in turn pivotally connected at 108 to a radius rod 109.

As seen in FIGURE 7, radius rod 109 extends radially from the lower end of steering tiller 31, with which it rotates integrally, so that an occupant of chair 42 may readily steer the front wheels 30l and 30r by manipulation of steering tiller 31.

FIGURE 7 also reveals that steering tiller 31 is actually an assembly of an upper demountable handle 31a and a lower tiller shaft 31b rotatably mounted in a tiller sleeve 35 which is welded to chassis 50.

Note, also, as best seen in FIGURE 3 that the flaring right fender 27r is provided with an opening through which tiller mounting sleeve 35 projects upwardly.

Figure 6:
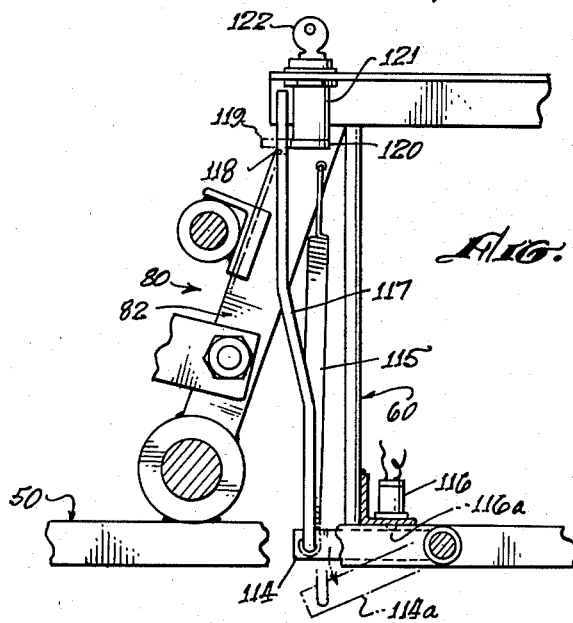
FIGURE 6 is a fragmentary side elevational view of the right side of the vehicle as indicated by the arrow 6 in FIGURE 2, showing in detail the interlock system between the ignition switch and the parking brake.

FIGURE 6 reveals the principal components of the brake and ignition interlock system. A hand brake lever 110, seen in FIGURE 1, rotates a transverse horizontal shaft 111, seen in FIGURE 3, which shaft carries brake pads 112, one of which is seen in FIGURE 3, for engaging the surfaces of the tires of rear wheels 43l and 43r, seen in FIGURE 2. The plan view of FIGURE 2 shows where rod 111 is journaled in the chassis 50 at 113l and 113r.

Rotating integrally with rod 111 is an interlock arm 114, seen in FIGURES 2 and 6. A spring 115 resiliently retains brake interlock arm 114, and consequently brake pads 112 out of engagement with wheels 43l and 43r, so that no braking occurs except when it is applied manually by pulling up on brake lever 110. When that occurs, brake interlock lever 114 moves downward from the brake-off position illustrated in full line in FIGURE 6, to the lower brake-applied position shown in phantom line at 114a. A stop light switch 116, mounted over brake interlock lever 114, which is normally closed, is retained in an open position (so that the red tail lights do not appear lighted) at all times when the brakes are not applied. However, when the brakes are applied, and brake interlock lever 114 drops to the position 114a, normally closed switch 116 is no longer held open, its plunger 116a being allowed to drop, and the red tail lights are illuminated unless the ignition key has disconnected the entire electrical system, as will be described hereinafter.

As seen in FIGURE 6, a substantially vertical brake interlock push rod 117 is pivotally connected at its lower end to a swinging end of the brake interlock lever 114, and at its upper portion 118 is engaged by a catch at 119 on the rotating tumbler 120 of ignition lock 121, when the latter is turned to an off position, so as to hold brake interlock lever 114 in the down, or brake applied, position at all times when the ignition lock 121 is rotated to an off position, so that the brake must be locked in an applied state, in order for the ignition to be turned off by means of key 122. When it is desired to turn the ignition lock 121 to the on position, slight pressure of further brake application is applied to brake lever 110, so as to relieve the pressure of catch 119, thus permitting the free rotation of tumbler 120 to the on position. During the on position, brake interlock push rod 117 may freely rise or fall with application or disengagement of the brake pads 112 by manual operation of brake lever 110.

Figure 8:
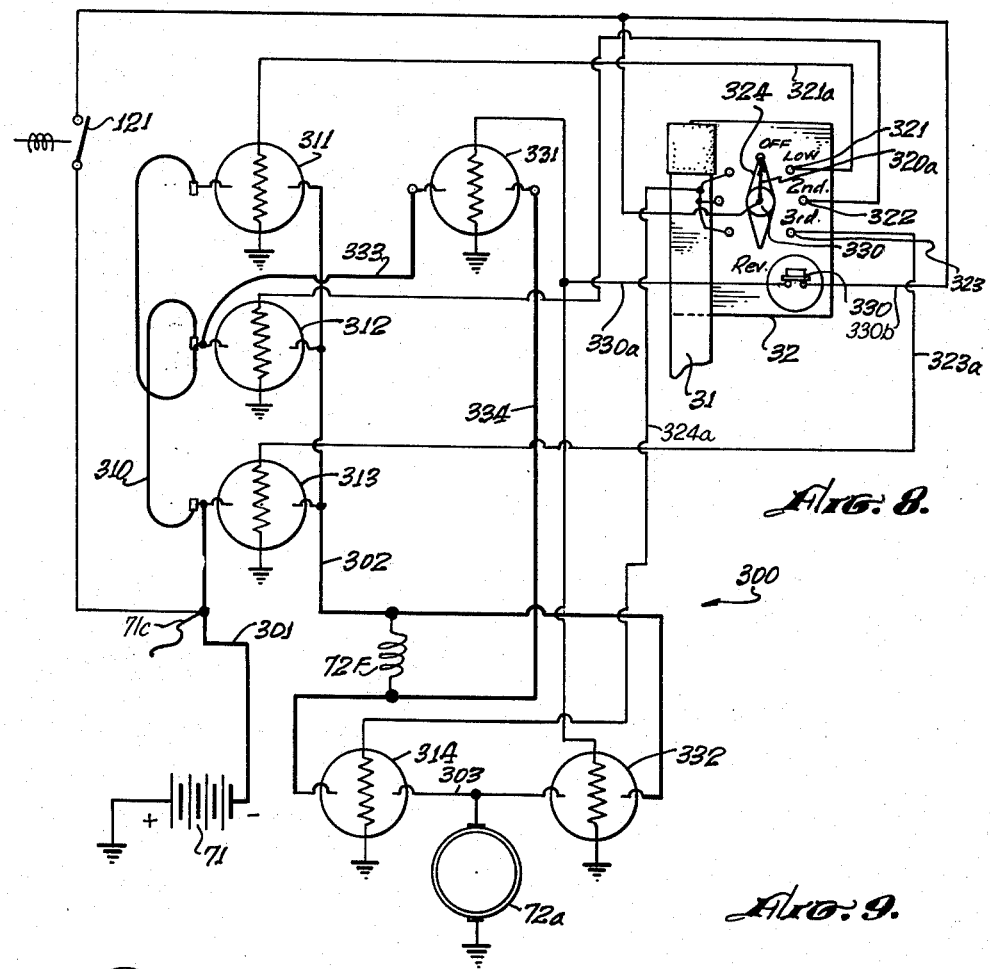
FIGURE 8 is an electrical wiring diagram of the drive control circuit by means of which the operator controls the electric motor during vehicle travel.

The three electrical circuits are illustrated by electrical diagrams in FIGURES 8, 9, and 10 as follows:

FIGURE 8.—Motor control circuit

The motor control circuit, referred to generally by the numeral 300, has two entirely separate sets of wiring, both operating at 6-volts, the one indicated in heavy lines being adapted to carry heavy amperage for the delivery of power to motor 72, and the lighter weight lines being used to indicate those used for carrying relatively small currents to the operating coils of the solenoid relays.

The armature of motor 72 is indicated at 72a and its fields at 72f.

The flow of power from the battery 71 to armature 72a and fields 72f takes place through heavy lines 301, 302, 303, a nickel-chrome resistor rod 310, and certain of relays 311, 312, 313, and 314, when the vehicle 20 is travelling in a forward direction, depending upon the speed selected by a rotary forward speed switch 320 located in control box 32 mounted at the handle end of tiller 31.

In rotary forward speed switch 320, contactor 320a may be rotated to low speed contact 321, intermediate speed contact 322, or high speed contact 323, thus closing, selectively, one of relays 311, 312, or 313, respectively, through the respective relay control lines 321a and 323a.

Rotary switch 320 also incorporates a wiper blade indicated only symbolically at 324, which connects to line 324a and closes solenoid 314 only when rotary switch 320 is being operated to connect one of its three speed terminals 321, 322, or 323.

It will be seen that speed steps are supplied by the resistor 310, which is all connected, half connected, or bypassed, for low, intermediate, or high speed in that order.

When it is desired to travel in a reverse direction, a reversing button 330, in control box 32 is depressed to connect lines 330a and 330b, thereby closing both of two reverse travel solenoids 331 and 332 to deliver reversing current to armature 72a by way of lines 301, half of resistor 310, line 333, relay 331, line 334.

FIGURE 9.—Lighting circuit

Two headlights 401 and 402 and two taillights 403 and 404 may be used for nighttime illumination or turn indication when operated by a blinker 405.

The electrical control box 32 contains illumination two way switch 406 and turn-indicating switch 407. These are illustrated twice in FIGURE 9, physically at the right, and again in the electrical diagram.

Switch 407 is an eight pole three-position switch adapted to connect the lighting circuit for flashing on either right or left turn, or, in series with illumination switch 406, for continuous illumination, which is the position illustrated.

FIGURE 10.—Rectifier circuit

The battery 71 receives direct charging current of the proper voltage from the output of a pair of transformers 75 and 76 through heavy lines 71a and 71b, connection to the battery being made at the point indicated in the motor control circuit in FIGURE 8 at 71c.

The rectifier indicated generally by the numeral 74 receives its power input from a 115-volt alternating current line through male plug 410, through fuse 411, and supply lines 412 and 413.

Supply lines reach transformer 75 and 76 only through a sensing unit indicated generally by the dashed outline box 420, the operation of which will be described in detail hereinafter.

After passing through the sensor unit 420, the alternating current is delivered through lines 431 to transformers 75 and 76, which have opposite terminal lines 433 and 434 connected to ground 435 through back to back silicon rectifiers 436 and 437 in order to deliver a rectified current of proper voltage to charging line 401.

Lines 441 and 442 detect the flow of charging current as long as the rectifier 74 is in operation, and make indication of this at pilot light 443. Pilot light 443 may be inside of housing 40, but its light is visible from the exterior by being conducted upwardly through a Lucite push rod 450.

Lucite push rod 450 is resiliently urged into a retracted upward position by spring means housed at 451, but not illustrated, since it is merely a standard retraction spring of any suitable type.

Recharging is initiated when plug 410 has been connected to a suitable source of 115-volt alternating current, by momentarily depressing Lucite push rod 450, so as to close a relay 421, which forms a key part of sensor unit 420. The purpose of sensor unit 420 is to continuously diminish charging current as battery 71 recovers its charge, and prevent overcharge which might damage battery 71. The holding coil 422 of relay coil 421 holds it in closed position as long as sufficient direct current is delivered to it through a silicon rectifier 423, resistor 424, and adjusting potentiometer 425, in a shunt line 426 around a pair of heavy resistors 427a and 427b, capacitors 428a and 428b being provided to operate in line 429 in conjunction with silicon rectifier 423.

As adequate charging of battery 71 is approached, the current passing through resistor 427a and 427b diminishes to the point at which there is insufficient voltage drop across it to continue to hold relay 421 in a closed recharging position. When this occurs, relay 421 opens, and pilot light 443 goes out.

Adjustment of the proper opening condition may be made by means of potentiometer 425.

While the invention has herein been shown and described in what is conceived to be the most practical and preferred embodiment, it is recognized that departures may be made therefrom within the scope of the invention, which is not to be limited to the details disclosed herein but to be accorded the full scope of the claims so as to embrace any and all equivalent devices.

Having described the invention, what is claimed as new in support of Letters Patent is:

1. A compact, single-passenger, electrically-powered vehicle which includes: a chassis comprising a rear chair-support portion and a forward foot-platform portion; a chair-support structure and chair projecting upwardly from said chair-support portion of said chassis; a pair of front wheels steerably mounted near the front of said chassis; a pair of rear wheels rotatably mouned at the rear of said chair-support portion; a heat-sink barrier structure disposed transversely of said chassis at the rear of said chair-support structure; rectifier recharging means mounted on one side of said barrier structure; electric motor means and motor control circuit means mounted on an opposite side of said barrier structure at an elevation lower than said chair means; drive means between said motor means and said rear wheels; and battery means for driving said motor means supported within said seat support structure.

2. A compact, single-passenger, electrically-powered vehicle which includes: a chassis comprising a rear chair-support portion and a forward foot-platform portion; a chair-support structure projecting upwardly from said chair-support portion of said chassis; a chair means supported on said chair-support structure; a pair of front wheels steerably mounted near the front of said chassis; a pair of rear wheels rotatably mounted at the rear of said chair-support portion, said rear wheels having a diameter less than the height of said chair-support structure; a heat-sink barrier structure disposed transversely of said chassis at the rear of said chair support structure; rectifier recharging means mounted on the forward side of said barrier structure; electric motor means and motor control circuit mounted on the rear side of said barrier structure at an elevation lower than said chair means; drive means between said motor means and said rear wheels; and battery means for driving said motor means supported within said seat support structure.

3. A compact, single-passenger, electrically-powered vehicle which includes: a chassis comprising a rear chair-support portion and a forward foot-platform portion; a chair-support structure projecting upwardly from said chair-support portion of said chassis; a chair means supported on said chair-support structure; a pair of front wheels steerably mounted near the front of said chassis, a pair of rear wheels of substantially larger diameter than said front wheels rotatably mounted at the rear of said chair-support portion, said rear wheels having a diameter less than the height of said chair-support structure; a heat-sink barrier structure disposed transversely of said chassis at the rear of said chair-support structure; rectifier recharging means mounted on the forward side of said barrier structure; electric motor means and motor control circuit means mounted on the rear side of said barrier structure at an elevation lower than said chair means; drive means between said motor means and said rear wheels; and battery means for driving said motor means supported within said seat support structure with its center of gravity carried forward of the axis of said rear wheels.

4. A compact, single-passenger, electrically-powered vehicle which includes: a chassis comprising rear chair-support portion and a forward foot-platform portion; a chair-support structure projecting upwardly from said chair-support portion of said chassis, and comprising a transverse horizontal hinge-axis support at its upper forward edge and a spring-support structure near the upper rear edge of said chair-support structure; a chair means supported on said chair-support structure and comprising a hinge mounting at said hinge axis and a resilient spring means bearing on said spring-support structure; a pair of front wheels steerably mounted near the front of said chassis, said front wheels having a radius not greater than said chassis elevation; resilient spring support means for said front wheels; a pair of rear wheels of substantially larger diameter than said front wheels rotatably mounted at the rear of said chair-support portion, said rear wheels having a diameter less than the height of said chair-support structure; a metal heat-sink barrier structure disposed transversely of said chassis at the rear of said chair support structure; rectifier recharging means mounted on the forward side of said barrier structure; electric motor means and motor control circuit means mounted on the rear side of said barrier structure at an elevation lower than said chair means; drive means between said motor means and said rear wheels; and battery means for driving said motor means supported within said seat support structure with its center of gravity carried forward of the axis of said rear wheels for all inclinations of said vehicle during travel.

5. A compact, single-passenger, electrically-powered vehicle which includes: a chassis comprising a rear chair-support portion and a forward foot-platform portion; a chair-support structure projecting upwardly from said chair-support portion of said chassis, and comprising a transverse horizontal hinge-axis support at its upper forward edge and a spring-support structure near the upper rear edge of said chair-support structure; a chair means supported on said chair-support structure and comprising a hinge mounting at said hinge axis and a resilient spring means bearing on said spring-support structure; a pair of front wheels steerably mounted near the front of said chassis, said front wheels having a radius not greater than said chassis elevation; a pair of rear wheels of substantially larger diameter than said front wheels rotatably mounted at the rear of said chair-support portion, said rear wheels having a diameter less than the height of said chair-support structure; a metal heat-sink barrier structure disposed transversely of said chassis at the rear of said chair support structure; rectifier recharging means mounted on the forward side of said barrier structure; electric motor means and motor control circuit means mounted on the rear side of said barrier structure at an elevation lower than said chair means, and disposed with its shaft parallel to the axis of said rear wheels; reduction drive means between said motor means and said rear wheels; battery means for driving said motor means supported within said seat support structure with its center of gravity carried forward of the axis of said rear wheels for all inclinations of said vehicle during travel; and tiller-control means at one side of said vehicle, said tiller-control means being in controlling connection with both the steering of said front wheels and the operation of said electric motor means.

6. A compact, single-passenger, electrically-powered vehicle which includes: a chassis located at an elevation approximately one step above ground, said chassis comprising a rear chair-support portion not substantially greater in area than the plan area of a single-passenger chair, and a forward foot-platform portion; a chair-support structure projecting upwardly from said chair-support portion of said chassis, and comprising a transverse horizontal hinge-axis support at its upper forward edge and a spring-support structure near the upper rear edge of said chair-support structure; battery means supported within said seat support structure; a chair means supported on said chair-support structure and comprising a releasable hinge mounting at said hinge axis and a resilient spring means bearing on said spring-support structure; a pair of front wheels steerably mounted near the front of said chassis, said front wheels having a radius not greater than said chassis elevation; resilient spring support means for said front wheels; a pair of rear wheels of substantially larger diameter than said front wheels rotatably mounted at the rear of said chair-support portion, said rear wheels having a diameter less than the height of said chair-support structure; a heat-sink barrier structure disposed transversely of said chassis at the rear of said chair support structure, said barrier including a metal panel adapted, during recharging, to baffle rising hot air toward the upper surface of said batteries; rectifier recharging means mounted on the forward side of said barrier structure, and including transformers at the lower part of said barrier structure; electric motor means and motor control circuit means mounted on the rear side of said barrier structure at an elevation lower than said chair means, and disposed with its shaft parallel to the axis of said rear wheels; reduction drive means between said motor means and said rear wheels; housing means enclosing said chair-support structure and said barrier-structure and components mounted thereon, said housing having openings to permit mounting of said chair means on said chair support structure, and openings above said battery means to discharge said upward flowing hot air and battery gases entrained therein during recharging; and demountable tiller-control means at one side of said foot-platform portion, said tiller-control means being in controlling connection with both the steering of said front wheels and the operation of said electric motor means.

7. A compact, single-passenger, electrically-powered vehicle which includes: a chassis comprising a rear chair-support portion and a forward foot-platform portion; a chair-support structure projecting upwardly from said chair-support portion of said chassis, and comprising a transverse horizontal hinge-axis support at its upper forward edge and a spring-support structure near the upper rear edge of said chair-support structure; battery means supported within said support structure; a chair means supported on said chair-support structure and comprising a hinge mounting at said hinge axis and a resilient spring means bearing on said spring-support structure; a pair of front wheels steerably mounted near the front of said chassis; a pair of rear wheels rotatably mounted at the rear of said chair-support portion, said rear wheels having a diameter less than the height of said chair-support structure; a heat-sink barrier structure disposed transversely of said chassis at the rear of said chair support structure, said barrier including a metal panel adapted, during recharging, to baffle rising hot air toward the upper surface of said batteries; rectifier recharging means mounted on the forward side of said barrier structure, and including transformers at the lower part of said barrier structure; electric motor means and motor control circuit means mounted on the rear side of said barrier structure at an elevation lower than said chair means, and disposed with its shaft parallel to the axis of said rear wheels; reduction drive means between said motor means and said rear wheels; housing means enclosing said chair-support structure and said barrier-structure and components mounted thereon, said housing having openings to permit mounting of said chair means on said chair support structure, and openings above said battery means to discharge said upward flowing hot air and battery gases entrained therein during recharging; and tiller-control means adjacent said chair means for steering said front wheels.

References Cited by the Examiner
UNITED STATES PATENTS

| | | | |
|---|---|---|---|
| 1,235,973 | 8/17 | Heid | 180—65 |
| 1,429,213 | 9/22 | Gladish | 180—1 |
| 2,306,042 | 12/42 | Custer | 180—65 X |
| 2,544,831 | 3/51 | Guyton | 180—65 X |
| 3,057,425 | 10/62 | Proett | 180—65 X |

PHILIP ARNOLD, *Primary Examiner.*

A. HARRY LEVY, *Examiner.*